Dec. 19, 1933.    T. F. KNOLES    1,939,988
AUTOMATIC OIL PURIFIER
Filed June 11, 1931

Inventor
Thomas F Knoles
By
Hardway Cather
Attorneys

Patented Dec. 19, 1933

1,939,988

UNITED STATES PATENT OFFICE 1,939,988

AUTOMATIC OIL PURIFIER

Thomas F. Knoles, Woodsboro, Tex.

Application June 11, 1931. Serial No. 543,594

1 Claim. (Cl. 210—51)

This invention relates to an automatic oil purifier.

An object of the invention is to provide a device of the character described for the purpose of separating water and impurities from oil produced from an oil well.

Oil as produced from a well is usually mixed with water, held in suspension therein, in such manner that it is difficult to separate the water from the oil before the oil is delivered into storage tanks. It is an object of the present invention to provide an apparatus of the character described whereby the oil passing therethrough will be automatically relieved of the water held in suspension therein and whereby said water may be drained off and the oil and gas delivered in a comparatively pure state, freed of the water.

The invention comprehends means whereby the gas may be trapped in the form of a gas pocket in the separating chamber and the oncoming oil forced through the gas in said pocket under pressure causing an ebullition or bubbling of the oil and an intimate mixture of the oil and gas whereby the water is caused to separate and fall to the bottom of the separating chamber to be drained off and the clean oil and gas may pass out from said chamber through a suitable out flow line provided for the purpose.

The invention also comprehends a novel method whereby oil, with water in suspension therein, may be agitated in such a manner as to cause the separation of the water from the oil.

With the above and other objects in view the invention has particular relation to certain novel features of construction operation and arrangement of parts, an example of which is given in this specification and illustrated in the accompanying drawing wherein.

Figure 1:
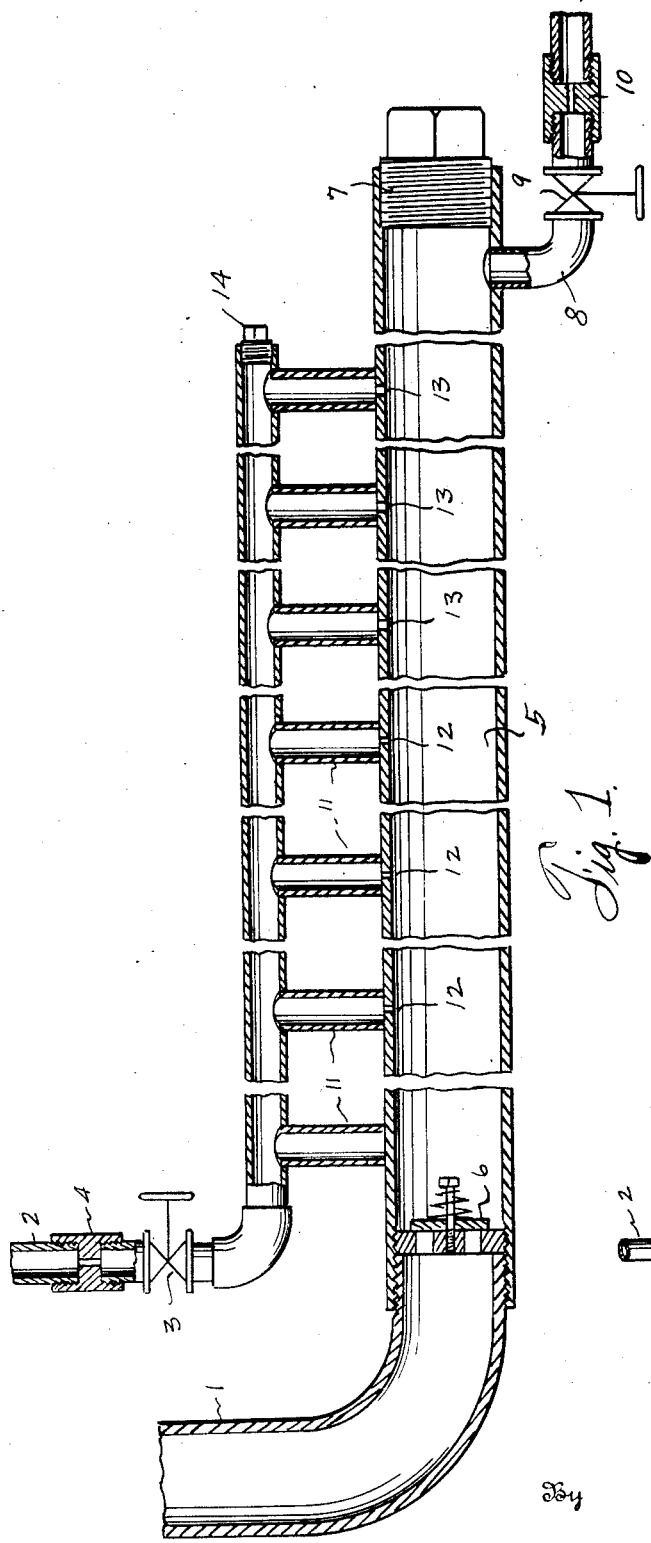
Figure 1 shows a vertical sectional view of the apparatus.
Figure 2:
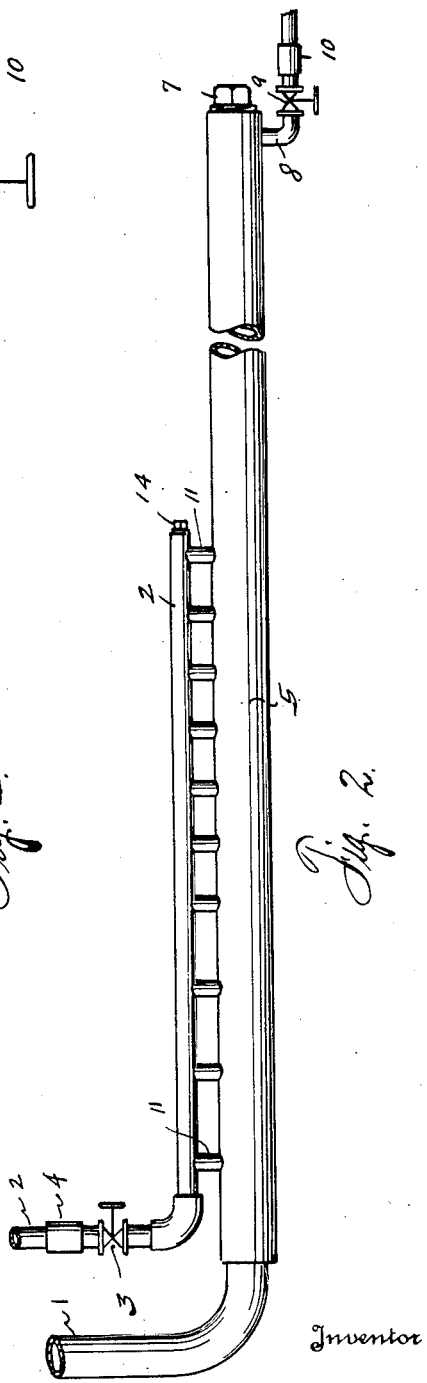
Figure 2 shows a side view thereof.

Referring now more particularly to the drawing wherein like numerals of reference designate similar parts in each of the figures, the numeral 1 designates the inflow line leading from an oil well or from a force pump or other source of supply, and the numeral 2 designates the outflow line leading to a tank or other receptacle and through which the clean oil and gas may be delivered to the receptacle provided to receive them. The outflow line is provided with a suitable shut off valve 3 and beyond said valve is equipped with a conventional choker 4. There is a separating chamber 5 into one end of which the inflow line 1 is connected and this end of this separating chamber is provided with a suitable back pressure valve 6. The opposite end of the separating chamber is closed preferably by means of a plug 7 and leading out from this last mentioned end of said chamber there is a water drain pipe 8 which is equipped with a shut off valve 9 and beyond said valve has the conventional choker 10.

The outflow line adjacent the inlet end of the separating chamber is turned parallel with said chamber and is supported thereon by a plurality of tubular nipples 11 which may be welded or otherwise secured to the top wall of the separating chamber and to the corresponding parallel portion of the outflow line 2.

There are the small gas outlets 12 leading from the separating chamber through the corresponding nipples 11 and the upper ends of these nipples are connected into the parallel portion of the outflow line as shown in Figure 1 and beyond these gas outlets there are the larger oil outlets 13 through the top wall of the chamber 5 through which the oil may enter the corresponding nipples 11 and pass on into the outflow line. The gas outlets 12 are spaced a selected distance from the inlet end of the chamber 5 and from each other to give the desired results and the oil outlet openings 13 are of a size to permit the required outlet flow of oil and are spaced such distance apart as may be found most practical. The end of the parallel turned portion of the outflow line is closed as by a plug 14. The oil from the well mingled with water in suspension therein is in an emulsified state, and with gas mingled therewith will enter the chamber 5 flowing past the check valve 6 and said separating chamber will be filled with the fluid. This fluid may be forced by a pump from any suitable source into the separating chamber. The gas will gradually rise and form a pocket in the upper part of the chamber 5 adjacent the inlet end of said chamber and this gas will gradually escape through the small openings 12. There will be sufficient inflow of gas to maintain said pocket of gas. The opposite end of the separating chamber 5 will be filled with oil and the separated water and the oil will be forced out through the larger openings as 13. The oil flowing into the chamber 5 will flow in under considerable pressure and as it flows into said gas pocket there will be an ebullition or bubbling of the oil thus breaking up its particles and causing the water to settle to the bottom of the chamber and said water will flow down to and into and through the outlet line 8 leaving the oil clean. The clean oil and gas will pass on out through the outlet line 2 to storage.

In many cases the well flows by heads, that is, intermittently and during the space between the heads the back pressure valve 6 will prevent the back flow of oil and gas from the chamber 5 into the inflow line 1.

The chokers 4 and 10 are adapted to the quantity of fluid to be taken care of depending on the quantity of the flow from the well and when the apparatus is once installed it will automatically operate, and has proven to be very efficient as an automatic oil purifier.

The drawings and description disclose what is now considered to be a preferred form of the invention by way of illustration only, while the broad principle of the invention will be defined by the appended claim.

What I claim is:—

Apparatus for purifying oil having a separating chamber, an inflow line connected into said chamber, a back pressure valve for preventing the backflow of fluid from said chamber into said line, an outflow line, said chamber having a series of passageways leading therefrom into said outflow line, said passageways being arranged at unequal distances from the point of connection of the inflow line into said chamber, the remote passageways being of greater capacity than the adjacent passageways.

THOMAS F. KNOLES.